(12) United States Patent
Li et al.

(10) Patent No.: US 6,182,041 B1
(45) Date of Patent: Jan. 30, 2001

(54) TEXT-TO-SPEECH BASED REMINDER SYSTEM

(75) Inventors: Yizhi Li, Mississauga; Alexander S. Ng, Scarborough; Trung Trinh, Nepean; Ross McNamara, Brampton, all of (CA)

(73) Assignee: Nortel Networks Limited, Montreal ( * ) Notice: Under 35 U.S.C. 154(b), the term of this patent shall be extended for 0 days.

(21) Appl. No.: 09/170,706

(22) Filed: Oct. 13, 1998

(51) Int. Cl.[7] .................................................. G10L 13/04
(52) U.S. Cl. ........................ 704/260; 704/258; 379/88.22
(58) Field of Search ............................. 379/88.22, 88.23; 704/260, 258

(56) References Cited

U.S. PATENT DOCUMENTS

| | | | |
|---|---|---|---|
| 4,969,136 | * 11/1990 | Chamberlin et al. | 369/29 |
| 5,093,854 | * 3/1992 | Sucato | 379/67 |
| 5,652,789 | 7/1997 | Miner et al. | 379/201 |
| 5,715,370 | * 2/1998 | Luther et al. | 704/275 |
| 5,740,230 | * 4/1998 | Vaudreuil | 379/88.22 |
| 5,740,231 | * 4/1998 | Cohn et al. | 379/88.22 |
| 5,771,273 | * 6/1998 | McAllister et al. | 379/88.01 |
| 5,915,001 | * 6/1999 | Uppaluru | 379/88.22 |
| 5,982,856 | * 11/1999 | Cohn et al. | 379/88.06 |

* cited by examiner

*Primary Examiner*—David R. Hudspeth
*Assistant Examiner*—Daniel Abebe

(57) ABSTRACT

Text-to-speech based reminder system. One or more servers within a communication network include hardware and software which allows the system to direct the collection of data about reminder, the translation of the reminder from text-to-speech, and the forwarding of the reminder to a recipient via an appropriate delivery method. The invention makes use of delivery methods such as e-mail, voicemail, or an existing telephone connection to communicate the speech reminder to a recipient. The recipient need not view a display screen to understand the content of the reminder, and needs no locally installed reminder software.

29 Claims, 4 Drawing Sheets

TEXT-TO-SPEECH BASED REMINDER SYSTEM

BACKGROUND

1. Field of the Invention

This invention is related to automated reminder systems. In particular, this invention concerns an automated reminder system which operates within a computer and/or telecommunication system. More particularly, this invention is related to such a reminder system which uses text-to-speech conversion to provide speech reminders.

2. Description of the Problem Solved

As life within our society becomes more complex, the average person must remember more and more things. Many different types of reminder systems have been devised in order to make remembering easier. Among the oldest and simplest is the "daily planner" booklet system in which a user writes down appointments, meetings, and other information that he or she must remember. The advent of computers in recent decades has produced numerous new types of reminder systems. Early mainframe computer systems often included a scheduling or reminder application into which a user typed data related to appointments and meetings. Using the clock in the computer system, the application could remind a user of an appointment or an event by displaying a reminder on the screen at an appropriate time.

In recent years, miniaturized electronics and personal computers have made possible reminder systems with even more capabilities. A so-called "personal data assistant" can keep track of numerous events, and remind a person of an upcoming event with an audible tone at a specific time. The personal computer software market is flooded with numerous personal assistance programs and scheduling programs which perform a reminder function on a personal computer, either stand-alone or networked. These programs typically allow a user to type in reminder data ahead of time. The program will then determine the time using the computer system clock and give the original or a second user a reminder of an upcoming event a specified number of minutes before the time of the event.

The present-day systems described above have some basic limitations. Most importantly, unless a recipient can remember what a reminder is about, a recipient must visibly observe a display screen once he or she hears an audio alerting signal. Also, a user must have some sort of specialized hardware in order to utilize such a reminder service. For example, the user either needs a personal data assistant or a personal computer. Additionally, a user must have direct access to specialized software which performs the reminder function. What is needed is a system which provides a way for users to gather full information about the reminder event without having to look at a display screen. Such a system would be especially useful if it allowed reminders to be generated for and communicated to users who do not have specific reminder capable hardware and software available at their personal workstation.

SUMMARY

The present invention meets the above needs by providing a system and method for supplying text-to-speech based reminder, services within a computer and telecommunication network. According to the present invention, one or more servers within a communication network include hardware and software which allows the servers to collect data about a reminder, direct the translation of the reminder from text-to-speech, and forward the reminder to a recipient via an appropriate delivery method. Using the invention, a recipient does not need specialized hardware or software to receive reminders. Rather the invention makes use of communication methods such as e-mail, voicemail, an Internet connection, and/or an existing telephone connection. Since reminders are delivered as speech, a recipient need not observe a display screen to understand the contents of a reminder message.

The network in which the invention is used includes a text-to-speech translation system, a server which controls the operation of the reminder service, and delivery systems such as a voicemail system or an e-mail system. The network may be small or large. In the preferred embodiment the network incorporates a universal compatibility software system and the components of the text-to-speech based reminder service are represented by adapters. In this embodiment, the operation of the invention is controlled by universal compatibility server. Reminder data is initially collected through a user interface such as a world-wide-web interface.

According to the present invention reminder data is first received from the user interface. A text message is collected and forwarded to a text-to-speech translation system. When a server receives a completion notification message from the translation system, the delivery system is directed to record the speech reminder, and the text-to-speech translation system is directed to send the reminder to the delivery system for recording. The delivery system can be an e-mail system, or a voicemail system. The voicemail system can be directed to automatically call a recipient on the telephone and play the speech reminder at a specified time. Alternatively, the reminder can simply be left in the recipient's personal mailbox in the voicemail system for retrieval by the recipient in the same way that his or her regular voicemail is retrieved. If an email system is used, reminder is attached to an e-mail using a speech format.

Many key aspects of the invention are implemented using computer software. In the preferred embodiment the computer software runs in a computer system or workstation or a collection of computer systems or workstations connected together by a network. Each computer system includes a processor system which is connected to a plurality of input/output devices and which includes computer program code for executing the method of the present invention. The program code is stored in memory in the computer system while executing, and is otherwise stored on a media such as optical disk or magnetic disk or tape. The computer program code can also be transferred over a network. The computer program code and the processor systems within the servers or workstations form the means for performing various operations required to make the invention work. The network in which the present invention operates includes a user interface server, a text-to-speech translation system, end terminal sets or telephones, a recipient delivery system, and a server which controls the operation of the reminder service. These components may be spread among various workstations and computer systems or many of the components may reside in the same computer system.

DETAILED DESCRIPTION OF PREFERRED EMBODIMENTS

Figure 1:
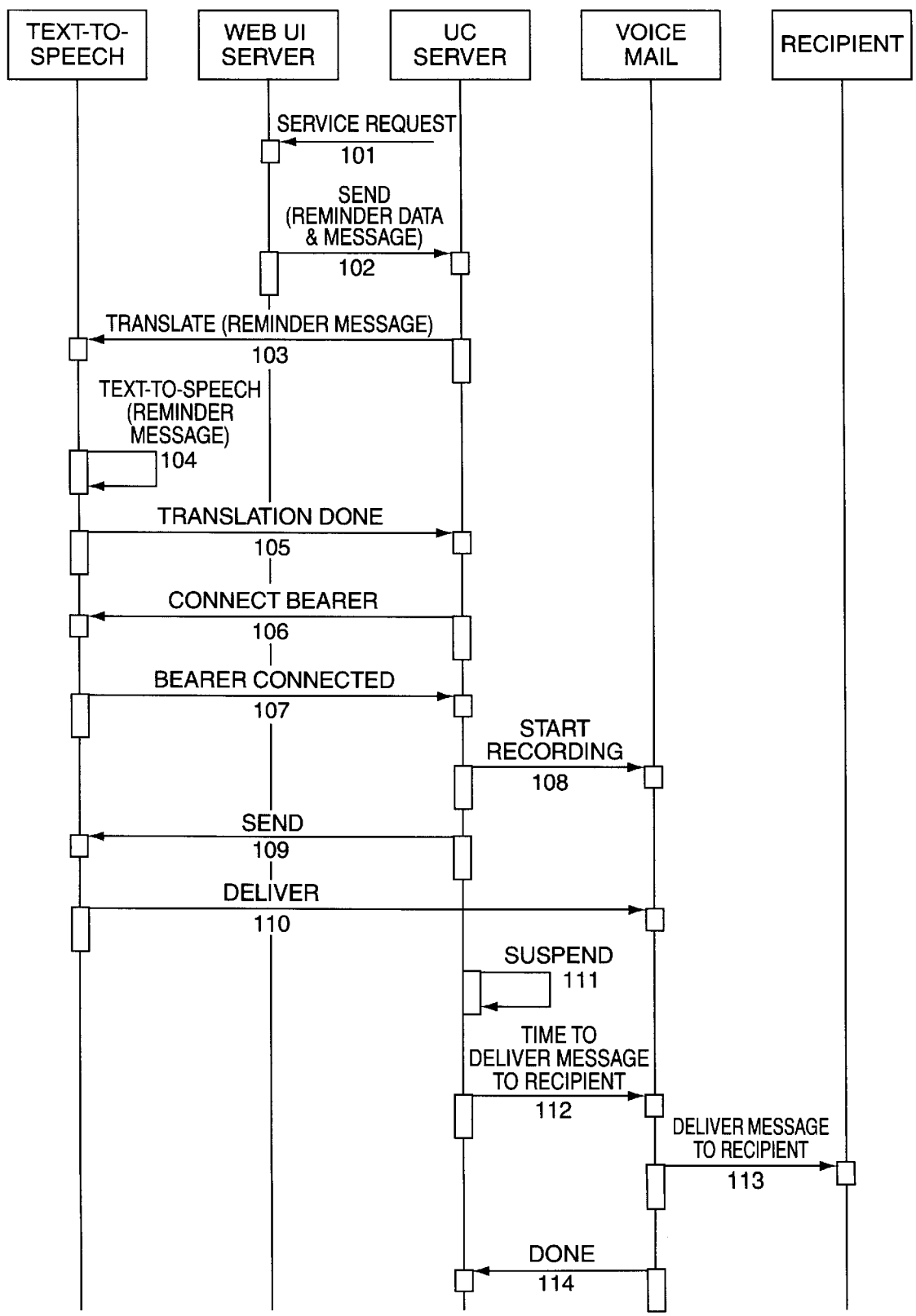
FIG. 1 is a message sequence chart illustrating the message flows involved in implementing the invention.

FIG. 1 is a message flow diagram which illustrates how the various components of the text-to-speech based reminder system of the present invention interact. At 101 a service request from a user is received by a user interface server. In the preferred embodiment a world-wide-web user interface is used; however, any type of user interface which can collect text input will work. At 102 a message is sent to the server which is controlling the overall operation of the reminder system. In the preferred embodiment this controlling server is a universal compatibility server or "UC" server within a universal compatibility software system network as described below. The information collected from the user which is sent to the server includes reminder data and the reminder message. The reminder data includes the type of reminder service (for example, voicemail or e-mail), a destination, and the date and time to deliver the reminder. The reminder message is the text which makes up the actual reminder information, for example, "please come to a meeting in Bob's office at three clock."

The server sends the reminder message to the text-to-speech translation system at 103 and asks for the text to be translated into speech. The text-to-speech translation system translates the reminder message at 104. At 105 the text-to-speech translation system notifies the controlling server that the translation is complete using a "translationdone" message. At 106 and 107 the controlling server directs the text-to-speech translation system to connect via a bearer channel to the delivery system. In this example a voicemail delivery system is used; however, an e-mail delivery system can also be used. At 108 the server directs the voicemail system to start recording the speech message and at 109 it directs the text-to-speech translation system to begin sending the speech message. At 110 the text-to-speech translation system delivers the speech message to the voicemail system. Where the universal compatibility software system is used to implement the invention, its communication capabilities allow use of existing functionality in many system components, hence, the voicemail system software does not need to be modified.

The voicemail system goes into a suspension mode at 111 until the server notifies it that it is time to deliver the message to the recipient at 112. In this case the voicemail system delivers the message to the recipient of 113 by calling the recipient's telephone terminal, and the process is completed at 114. If an e-mail system is used instead of a voicemail system, the speech reminder is attached to an e-mail message which is in turn sent to the e-mail address of the recipient. In the case of a voicemail delivery system, the delivery of the message at 110 is to a special mailbox in the voicemail system which is known only to the text-to-speech based reminder system. If voicemail is used as the final delivery mechanism, the message is delivered to the recipient's personal voicemail box if the recipient does not answer his or her phone when it rings with the reminder message. It is also possible to design a system so that the message can be delivered directly to the recipient's personal mailbox. This direct delivery can be done automatically for all reminders, or can be optionally selected by the person generating the reminder, for example, by using a special telephone number as the recipient number.

The reminder system of the present invention requires various components to operate. These components are preferably implemented in computer software and hardware. The components can be distributed across a network of computing and telecommunication hardware devices. Alternatively, most of these components or all of these components can reside on a single workstation. In the preferred embodiment the text-to-speech based reminder system of the present invention operates within a universal compatibility software system has described in U.S. patent application 08/891,459, filed Jul. 11, 1997, claiming priority on U.S. provisional application 60/033,211, filed Nov. 29, 1996, which is assigned to the assignee of the present invention and which is incorporated herein by reference.

The universal compatibility software system (UCSS) as described in the reference includes a family of software packages that allow real-time internetworking among stand-alone network services. The UCSS provides a linkage between systems such as voicemail, e-mail, an Internet services. The UCSS is controlled by a universal compatibility controller which resides typically in a general purpose computing platform which we call the universal compatibility server or "UC" server. The general purpose computing platform is physically implemented in the preferred embodiment by a personal computer or workstation.

In the universal compatibility software system, disparate hardware and software systems are represented to the UC server by adapters. Adapters are entities or agents which handle any translation which is needed to communicate between the disparate systems. Adapters translate information from one form to another as needed. In FIG. 1, the various components of the text-to-speech based reminder system illustrated at the top of the figure can be actual software components which communicate directly with the server. However, in the UCSS implementation these are adapters.

Figure 2:
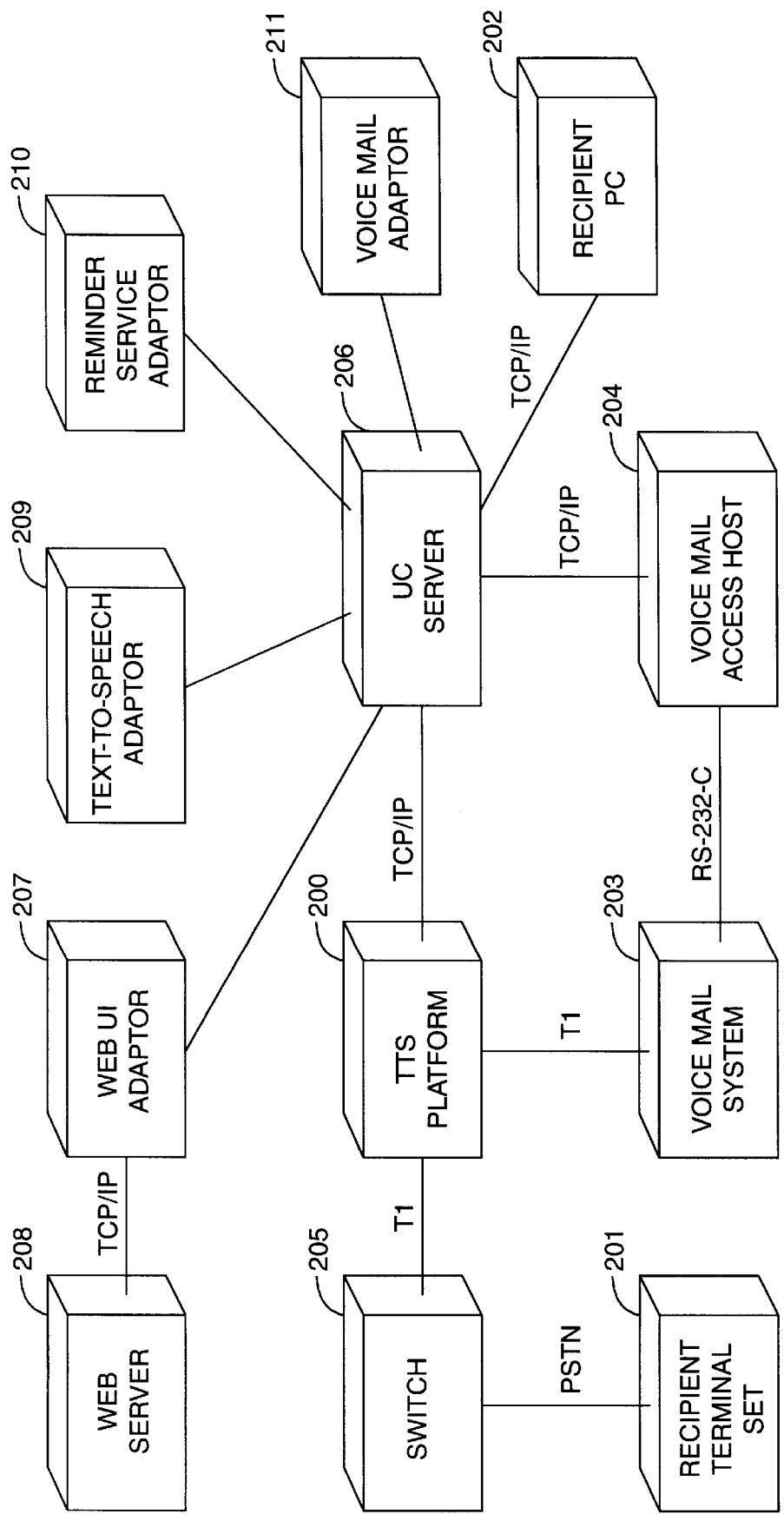
FIG. 2 is a diagram which illustrates one example of a network in which the invention has been implemented.

FIG. 2 illustrates a conceptual network diagram of the text-to-speech based reminder system of the present invention implemented in a universal compatibility software system as described above. UC server 206 controls the operation of the reminder system. UC server 206 is connected to Text to Speech hardware platform (TTS) 200 and voice mail access host 204. The text-to-speech translation system adapter 209, a reminder service agent 210, and voicemail adapter 211 reside on UC server 206. The voicemail adapter 211 represents the delivery system which can be any of numerous types, but is shown as a voicemail system in this example. In this particular example the user interface adapter 207 resides on the UC server 206 and represents a world-wide-web user interface (WebUI). The reminder service agent 210 maintains subscriber profiles for subscribers to the text-to-speech based reminder service.

Hardware units 201 through 205 of FIG. 2 serve the users and recipients of the reminder system of the present invention. Switch 205 serves the recipient terminal set 201 over a public switched telephone network (PSTN). UC server 206 is connected to recipient PC 202, and a recipient voicemail access host 204 which is in turn connected to the voicemail system 203 via a data interface such as an RS-232 interface. The PC to server connection is via TCP/IP. The voicemail system server to TTS hardware platform connection is via a T1 trunk. These connections and all others illustrated in FIG. 2 are shown by way of example. There are many ways to connect the various components in such a network.

The text-to-speech translation system used with the present invention can be implemented using any standard text-to-speech conversion algorithm. Text-to-speech conversion is a mature art and various methods of accomplishing the conversion are known. In the preferred embodiment, the process begins by converting text to phonemic code. A sentence parser breaks the input stream into separate words and locates some clause boundaries. The sentence parser also recognizes and deals with phonemic symbols and commands that may have been added to the input text. A word parser breaks words into their component parts, yielding words in pronounceable form. Strings of text that do not form pronounceable words are spelled out letter by letter. A number formatter is used if the text contains numbers. A dictionary lookup routine searches pronunciation dictionaries. A letter-to-sound module uses a set of pronunciation rules to assign phonemic form and stress patterns to words not found in the dictionary. A phrase structure model re-combines all phonemic output from the dictionary and other modules. Duration of phonemes and pitch commands are computed for each clause and appropriate sound variants are selected for those phonemes that can be pronounced in more than one way. Once the text has been converted to phonemic code, the phonemic code is converted to synthesizer control commands. Clauses are converted to control signals for the speech synthesizer. The control commands are then converted to speech by the speech synthesizer, which computes speech waveforms with acoustic characteristics that are determined by the synthesizer control commands received. Dozens of acoustic parameters and thousands of values for these parameters are taken into account.

A simpler reminder system can be designed in which only a standard library of reminders are used. In this case, the text-to-speech translation consists of looking up the standard speech reminder components in a database when they are triggered by specific keywords or other information in the reminder data. This "other information" can include graphical buttons being pressed or specific selections from graphical spin boxes. In this embodiment, the text-to-speech translation system is less complex because the input is more constrained.

Figure 3:
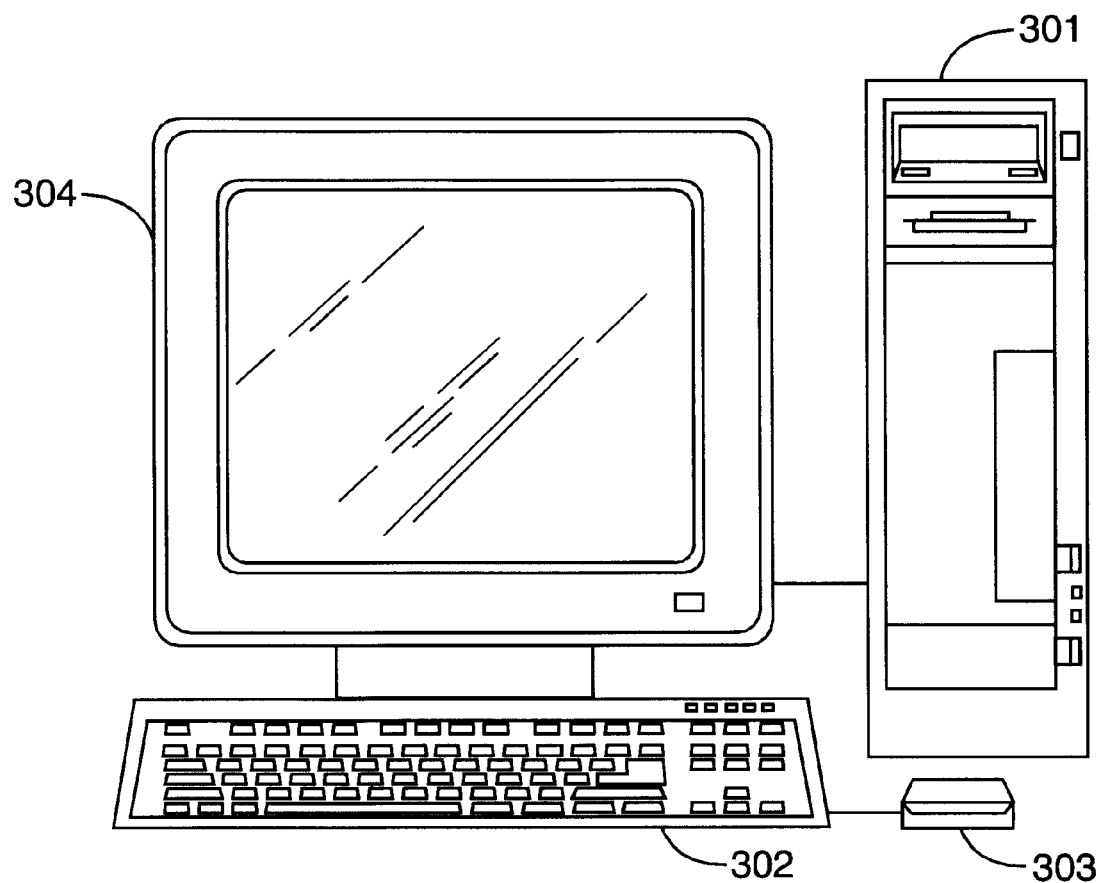
FIG. 3 illustrates a workstation which can be used to implement a server which is used with the present invention.

FIG. 3 illustrates a personal computer workstation on which the software of the present invention can be operated. Input output (I/O) devices such as keyboard 302, mouse 303, and display 304. The display is used to show an operator a computer desktop on which various information is displayed. System unit 301 is connected to all of the I/O devices, and contains memory, media devices, and a central processing unit (CPU) all of which together execute the software of the present invention and cause the various agents and software elements of the present invention to operate when the invention is in use. A network interface is normally implemented via an adapter card however for the sake of simplicity it is not shown.

Figure 4:
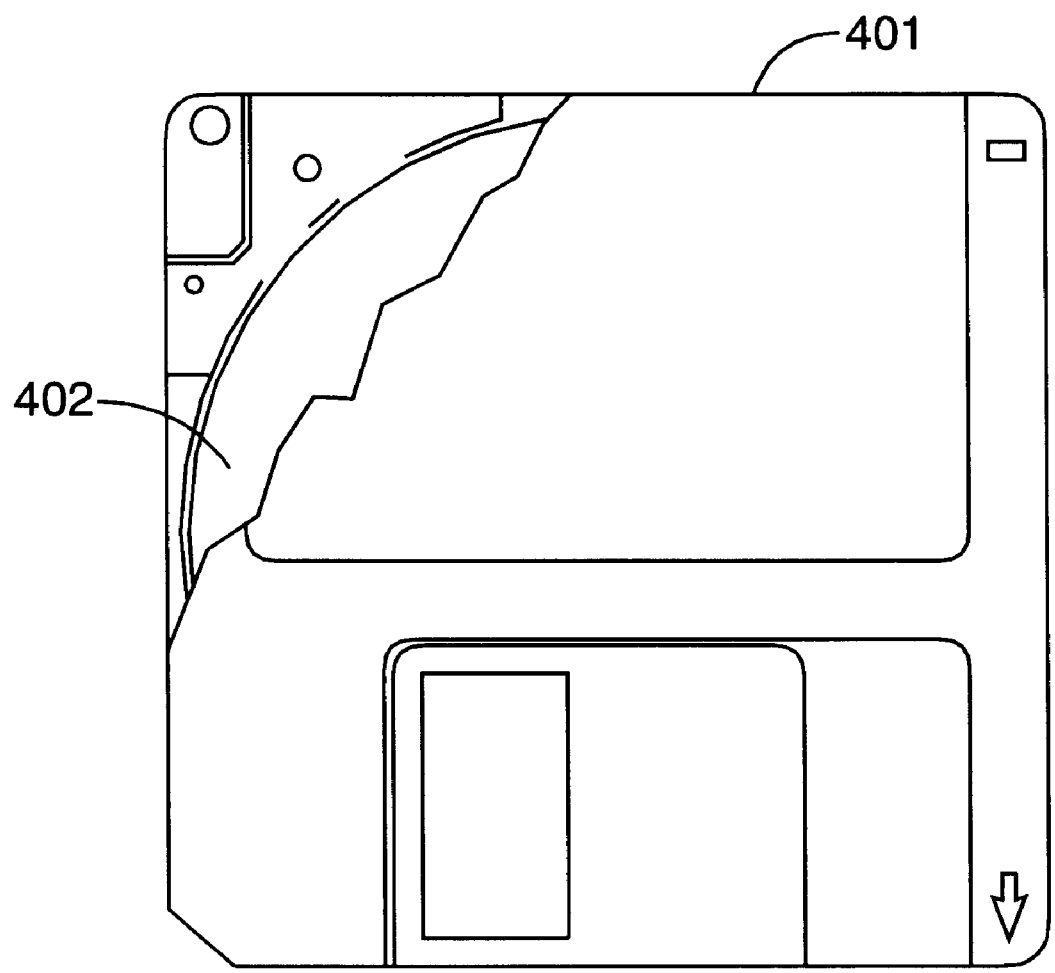
FIG. 4 illustrates an example of a media on which computer program code which implements the present invention may be stored.

As previously mentioned, appropriate computer program code in combination with appropriate hardware implements most of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation over the Internet or some other type of network. FIG. 4 illustrates one example of a media. FIG. 4 shows a diskette of the type where magnetic media 402 is enclosed in a protective jacket 401. Magnetic field changes over the surface of the magnetic media 402 are used to encode the computer program code. In this way the computer program code is stored for later retrieval.

We have described specific embodiments of our invention which provides a text-to-speech based reminder system which can be implemented in a computing and telecommunication network. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. In a universal compatibility server wherein one or more adapter software entities reside, the server for use in a universal compatibility software system, a method of delivering a reminder, the method comprising the steps of:
   receiving reminder data from a user interface adapter software entity;
   sending a text reminder message to a text-to-speech translation system, the text-to-speech translation system being represented in the universal compatibility software system by a text-to-speech adapter software entity for providing translation of information;
   directing a delivery system, represented in the universal compatibility software system by a delivery system adapter software entity, to begin recording; and
   directing the text-to-speech translation system to send a speech reminder message to the delivery system.

2. The method of claim 1 wherein the delivery system is a voicemail system, and further comprising the steps of:
   suspending execution until a pre-selected delivery time; and
   directing the voicemail system to deliver the speech reminder message to a recipient.

3. The method of claim 2 wherein the user interface is a world-wide-web interface.

4. The method of claim 1 wherein the delivery system is an e-mail system.

5. The method of claim 3 wherein the user interface is a world-wide-web interface.

6. The method of claim 1 wherein the user interface is a world-wide-web interface.

7. A computer program product for delivering a reminder within a universal compatibility software system wherein one or more adapter software entities reside in a universal compatibility server, the computer program product having a medium with a computer program embodied thereon, the computer program comprising:
   computer program code for receiving reminder data from a user interface adapter software entity;
   computer program code for sending a text reminder message to a text-to-speech translation system, the text-to-speech translation system being represented in the universal compatibility software system by a text-to-speech adapter software entity for providing translation of information;
   computer program code for directing a delivery system, represented in the universal compatibility software system by a delivery system adapter software entity, to begin recording; and
   computer program code for directing the text-to-speech translation system to send a speech reminder message to the delivery system.

8. The computer program product of claim 7 wherein the delivery system is a voicemail system, and further comprising:

computer program code for suspending execution until a pre-selected delivery time; and computer program code for directing the voicemail system to deliver the speech reminder message to a recipient.

9. The computer program product of claim 8 wherein the user interface is a world-wide-web interface.

10. The computer program product of claim 7 wherein the delivery system is an e-mail system.

11. The computer program product of claim 10 wherein the user interface is a world-wide-web interface.

12. The computer program product of claim 7 wherein the user interface is a world-wide-web interface.

13. A universal compatibility server for a universal compatibility software system, the universal compatibility server including a computer program product for delivering a reminder within a network, the universal compatibility server comprising:

a plurality of input/output devices; and a processor system connected to the network and to the plurality of input/output devices, the processor system including a computer program product, the computer program product including a computer program further comprising computer program code for receiving reminder data from a user interface system and computer program code for sending a text reminder message to a text-to-speech translation system and directing the text-to-speech translation system to send a speech reminder message to a delivery system, wherein the delivery system, the text-to-speech translation system, and the user interface system are all represented within the universal compatibility software system by adapter software entities for handling translation for communication between disparate systems, and wherein at least one of the adapter software entities resides on the universal compatibility server.

14. The universal compatibility server of claim 13 wherein the delivery system is a voicemail system and the computer program further includes computer program code for directing the voicemail system to deliver the speech reminder message to a recipient at a pre-selected delivery time.

15. The universal compatibility server of claim 14 wherein the user interface system includes a world-wide-web interface.

16. The universal compatibility server of claim 13 wherein the delivery system is an e-mail system.

17. The universal compatibility server of claim 16 wherein the user interface system includes a world-wide-web interface.

18. The universal compatibility server of claim 13 wherein the user interface system includes a world-wide-web interface.

19. Apparatus for delivering a reminder within a universal compatibility software system wherein at least one adapter software entity resides on a universal compatibility server, the apparatus comprising:

means for receiving reminder data from a user interface universal compatibility software system adapter software entity;

means for sending a text reminder message to a text-to-speech translation system, the text-to-speech translation system being represented in the universal compatibility software system by a text-to-speech adapter software entity for providing translation of information;

means for directing a delivery system, represented in the universal compatibility software system by a delivery system adapter software entity, to begin recording; and means for directing the text-to-speech translation system to send a speech reminder message to the delivery system.

20. The apparatus of claim 19 wherein the delivery system is a voicemail system, the apparatus further comprising:

means for suspending execution until a pre-selected delivery time; and means for directing the voicemail system to deliver the speech reminder message to a recipient.

21. The apparatus of claim 20 wherein the user interface is a worldwide-web interface.

22. The apparatus of claim 19 wherein the delivery system is an e-mail system.

23. The apparatus of claim 22 wherein the user interface is a worldwide-web interface.

24. The apparatus of claim 19 wherein the user interface is a worldwide-web interface.

25. In a universal compatibility software system network, a method of delivering a reminder to a recipient, the method comprising the steps of:

receiving a service request at a user interface system and sending a text reminder message to a universal compatibility server, wherein the user interface system is represented on the universal compatibility server by a user interface adapter software entity;

sending the text reminder message to a text-to-speech translation system for text-to-speech translation;

translating the text reminder message into a speech reminder message;

sending the speech reminder message to a delivery system, the delivery system being represented on the universal compatibility server by a delivery system adapter software entity; and recording the speech reminder message in the delivery system.

26. The method of claim 25 wherein the delivery system is a voicemail system and further comprising the steps of:

suspending execution until a pre-selected delivery time; and delivering the speech reminder message to a recipient at the pre-selected delivery time by the voicemail system.

27. A computer program product for delivering reminders in a universal compatibility software system network, the computer program product having a medium with a computer program embodied thereon, the computer program comprising:

computer program code for receiving a service request at a user interface system and sending a text reminder message to a universal compatibility server, wherein the user interface system is represented on the universal compatibility server by a user interface adapter software entity;

computer program code for sending the text reminder message to a text-to-speech translation system for text-to-speech translation;

computer program code for translating the text reminder message into a speech reminder message;

computer program code for sending the speech reminder message to a delivery system, the delivery system being represented on the universal compatibility server by a delivery system adapter software entity; and computer program code for recording the speech reminder message in the delivery system.

28. The computer program product of claim 27 wherein the delivery system is a voicemail system and the computer program further comprises:

computer program code for suspending execution until a pre-selected delivery time; and computer program code for delivering the speech reminder message to a recipient at the pre-selected delivery time by the voicemail system.

29. A universal compatibility software system network which provides for the delivery of reminders to recipients, the network comprising:

means for receiving a service request at a user interface system and sending a text reminder message to a universal compatibility server, wherein the user interface system is represented on the universal compatibility server by a user interface adapter software entity;

means for sending the text reminder message to a text-to-speech translation system for text-to-speech translation;

means for translating the text reminder message into a speech reminder message;

means for sending the speech reminder message to a delivery system, the delivery system being represented on the universal compatibility server by a delivery system adapter software entity; and means for recording the speech reminder message in the delivery system.

\* \* \* \* \*